UNITED STATES PATENT OFFICE.

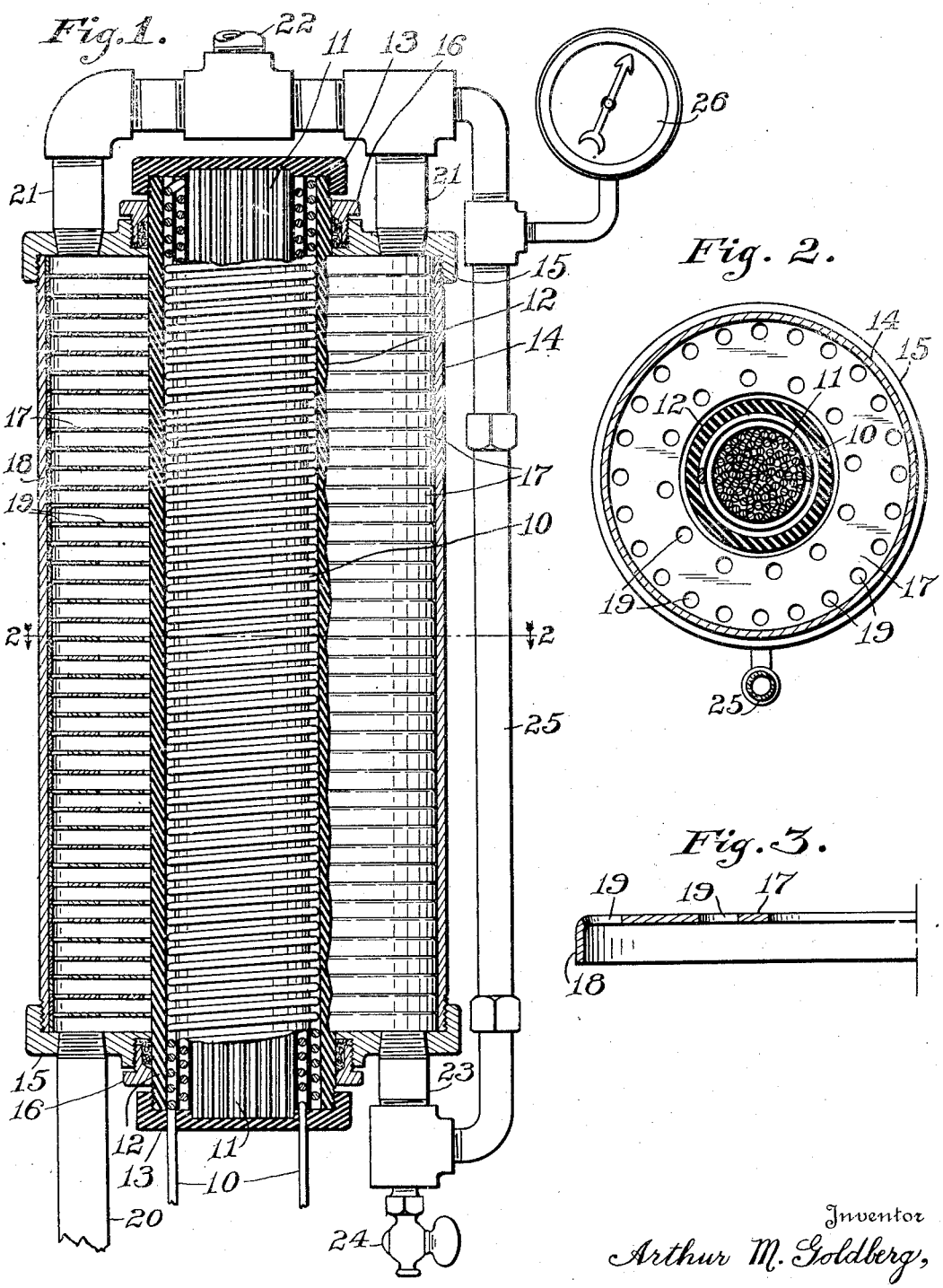

ARTHUR M. GOLDBERG, OF INDIANAPOLIS, INDIANA, ASSIGNOR TO ELECTRIC CONTROLLER COMPANY, INC., OF INDIANAPOLIS, INDIANA, A CORPORATION OF INDIANA.

ELECTRIC WATER HEATER.

1,421,937.         Specification of Letters Patent.      Patented July 4, 1922.

Application filed July 28, 1921. Serial No. 488,123.

*To all whom it may concern:*

Be it known that I, ARTHUR M. GOLDBERG, a citizen of the United States, residing at Indianapolis, in the county of Marion and State of Indiana, have invented a new and useful Electric Water Heater, of which the following is a specification.

It is the object of my invention to provide a simple and effective electric water heater, for alternating currents, whereby the water may be heated not only by the heat produced by the primary conductors, but also, and mainly, by the heat produced in short-circuited secondaries formed as thin plates of magnetic material immersed in the water and heated both by the secondary currents and by the hysteresis loss due to the magnetic properties.

The accompanying drawing illustrates my invention: Fig. 1 is a vertical central section through a heater embodying my invention, the secondary plates being shown in elevation in the right-hand part of the figure; Fig. 2 is a section on the line 2—2 of Fig. 1; and Fig. 3 is an enlarged sectional view of one-half of a secondary plate.

A primary winding 10, which is to be supplied with alternating current, is wound on a suitable core 11, which is preferably formed of a bundle of iron wires; and this core and primary winding are mounted within an insulating tube 12, of fiber, glass, or other suitable material, conveniently being held therein by caps 13 on the end of such tube. The core and primary winding may be removed from the tube 12 by first removing the lower cap 13, without disturbing any of the other parts of the device. The tube 12 and its contents are located centrally within an outer tubular casing 14, having end members 15 screwed on to its ends. The tube 12 preferably extends through both end members 15, with packed joints 16 in such end members, which packed joints serve to carry the tube 12 and hold it rigidly in place. The outer casing 14 and the end members 15 are of iron or steel, so that they serve as a path for the magnetic flux from one end of the core 11 to the other. Within the casing 14 and surrounding the tube 12 are a series of centrally perforated secondary plates 17, which are made of sheet-iron or sheet-steel stampings in the form of pie plates so that their peripheral flanges 18 space adjacent plates apart, as is clear from Fig. 1. The plates 17 preferably fit rather tight within the casing 14, but are shown as clearing the central insulating tube 12. In addition to their central perforations, through which the tube 12 passes, the plates 17 have any desired number of other perforations 19, which with the central perforations permit the passage of water and steam through the plates 17.

The water to be heated is conveniently supplied by a supply pipe 20, which enters through the lower cap 15. The steam or hot water from the heater is discharged through the upper cap 15; as shown, through two pipes 21 which are connected above the heater to a main outlet pipe 22. The water can be drained from the heater through a pipe 23 entering through the bottom cap 15 and provided with a drain stop-cock 24. A glass water-gage 25 may be provided at the side, if desired, for indicating the water level within the casing 14, this water-gage being suitably connected to the top and bottom of the heater, as by suitable pipes connected to the pipe 23 and to one of the pipes 21; and if desired, a steam-pressure gage 26 may be connected to the top of the heater, conveniently through the same pipe by which the upper end of the water-gage 25 is connected thereto.

In operation, water is supplied to the heater by the pipe 20, is heated therein, and converted into steam if desired, and the hot water or steam passes out through the pipes 21 and 22 and is carried to the desired place. To heat the water passing through the heater, alternating current is supplied to the primary winding 10. This heats the conductor forming such primary winding, which produces some heating of the water in the heater. In addition, secondary currents are produced in the casing 14, in the end members 15, and in the secondary plates 17; and all these elements form short-circuited secondaries of rather low resistance, so that these secondary currents produce a considerable heating effect, which is transmitted from these parts to the water or steam in contact with them. In addition to the heating effect from the primary conductor 10 and from the secondary currents in the short-circuited secondaries referred to, there is a third heating effect, due to the hysteresis loss in the same parts 14, 15, and 17 which also serve as short-circuited secondaries. All these parts are of iron or steel, and carry an alternating magnetic flux, the alternations of which produce the hysteresis heating effect referred to. These three heating effects cooperate to heat the water and steam, and the heating is effectively transmitted to the water from the secondary plates 17 by reason of their immersion in the water and of the relatively small bodies of water which lie between adjacent secondary plates. If the heater is designed to produce steam, some of the upper secondary plates 17 may be omitted, but this is a matter of preference.

I claim as my invention:

1. An alternating-current electric water-heater, comprising an outer water-containing casing having inlet and outlet openings, a primary winding and core within said outer casing, an insulating tube surrounding said primary winding and core, and a plurality of sheet-metal plates located within said outer casing and surrounding said primary winding and core and insulating tube.

2. An alternating-current electric water-heater, comprising an outer water-containing casing having inlet and outlet openings, a primary winding and core within said outer casing, and a plurality of sheet-metal plates located within said outer casing and surrounding said primary winding and core.

3. An alternating current electric water-heater, comprising an outer water-containing casing having inlet and outlet openings, a primary winding and core within said outer casing, and a plurality of sheet-metal plates located within said outer casing and surrounding said primary winding and core, said outer casing being of magnetic material.

4. An alternating-current electric water-heater, comprising an outer water-containing casing having inlet and outlet openings, a primary winding and core within said outer casing, and a plurality of sheet-metal plates located within said outer casing and surrounding said primary winding and core, said sheet-metal plates being of magnetic material.

5. An alternating-current electric water-heater, comprising an outer water-containing casing having inlet and outlet openings, a primary winding and core within said outer casing, and a plurality of sheet-metal plates located within said outer casing and surrounding said primary winding and core, both said outer casing and said sheet-metal plates being of magnetic material.

6. An alternating-current electric water-heater, comprising an outer water-containing casing having inlet and outlet openings, a primary winding and core within said outer casing, and a plurality of sheet-metal plates located within said outer casing and surrounding said primary winding and core, said sheet-metal plates being provided with peripheral flanges for spacing them apart within said casing.

7. An alternating-current electric water-heater, comprising an outer water-containing casing having inlet and outlet openings, a primary winding and core within said outer casing, and a plurality of sheet-metal plates located within said outer casing and surrounding said primary winding and core, said sheet-metal plates being of magnetic material, said sheet-metal plates being provided with peripheral flanges for spacing them apart within said casing.

8. An alternating-current electric water-heater, comprising an outer water-containing casing having inlet and outlet openings, a primary winding and core within said outer casing, an insulating tube surrounding said primary winding and core, and a plurality of sheet-metal plates located within said outer casing and surrounding said primary winding and core and insulating tube, said outer casing being provided with end members, and said insulating tube extending through one or both of said end members by a packed joint or joints.

In witness whereof, I have hereunto set my hand at Indianapolis, Indiana, this 25th day of July, A. D. one thousand nine hundred and twenty-one.

ARTHUR M. GOLDBERG.